United States Patent
Monsalve et al.

[11] Patent Number: 5,919,505
[45] Date of Patent: Jul. 6, 1999

[54] SHELF-STABLE BUTTER CONTAINING MICROWAVE POPCORN ARTICLE AND METHOD OF PREPARATION

[75] Inventors: Adelmo E. Monsalve; Gary V. Peterson, both of Plymouth; Philip E. Palkert, Eden Prairie, all of Minn.

[73] Assignee: General Mills, Inc., Minneapolis, Minn.

[21] Appl. No.: 08/784,850

[22] Filed: Jan. 15, 1997

[51] Int. Cl.⁶ ............................................. A23L 1/00
[52] U.S. Cl. ...................... 426/107; 426/111; 426/115; 426/120; 426/126; 426/394; 426/395; 426/603; 426/663
[58] Field of Search .................... 426/107, 111, 426/115, 581, 603, 93, 120, 663, 126, 394, 395, 237

[56] References Cited

U.S. PATENT DOCUMENTS

| | | |
|---|---|---|
| 3,851,574 | 12/1974 | Katz et al. |
| 4,096,281 | 6/1978 | Young ........................ 426/93 |
| 4,450,180 | 5/1984 | Watkins . |
| 4,548,826 | 10/1985 | Watkins . |
| 4,844,921 | 7/1989 | Bakal ......................... 426/603 |
| 4,880,646 | 11/1989 | Lew ............................ 426/93 |
| 4,904,487 | 2/1990 | LaBaw et al. |
| 4,904,488 | 2/1990 | La Baw ..................... 426/93 |
| 4,906,490 | 3/1990 | Bakal ......................... 426/603 |
| 4,960,606 | 10/1990 | Crosby ...................... 426/603 |
| 5,023,096 | 6/1991 | Plachman ................. 426/93 |
| 5,190,777 | 3/1993 | Anderson ................. 426/113 |
| 5,284,666 | 2/1994 | Graf ............................ 426/93 |
| 5,354,572 | 10/1994 | Miller ....................... 426/663 |
| 5,431,945 | 7/1995 | Miller ....................... 426/663 |
| 5,443,858 | 8/1995 | Jensen ....................... 426/93 |
| 5,514,407 | 5/1996 | Perlman ................... 426/607 |
| 5,585,127 | 12/1996 | Freeport ................... 426/93 |
| 5,624,703 | 4/1997 | Perlman ................... 426/607 |
| 5,690,979 | 11/1997 | Bournes ................... 426/307 |
| 5,695,806 | 12/1997 | Bateman .................. 426/581 |

FOREIGN PATENT DOCUMENTS

WO 95/01105  1/1995  WIPO .

OTHER PUBLICATIONS

Robert S. Igoe, Dictionary of Food Ingredients, 1983, p. 19.
Matz 1976 Snack Food Technology AVI Publishing Company Inc Westport CT pp. 116–128.
Potter 1978 Food Science AVI Publishing Company Inc, Westport CT pp. 491–493.

*Primary Examiner*—Carolyn Paden
*Attorney, Agent, or Firm*—John A. O'Toole; L. MeRoy Lillehaugen

[57] ABSTRACT

Disclosed are microwave shelf stable popcorn articles that contain real butter. The articles comprise any conventional microwave popcorn bag and an improved popcorn/fat charge. In addition to kernel popcorn and fat, the charge further essentially includes about 1% to 8% of a high fat butter constituent. By virtue of selecting a particularly defined high fat butter ingredient, microwave popcorn articles can be prepared that are shelf stable.

24 Claims, 1 Drawing Sheet

SHELF-STABLE BUTTER CONTAINING MICROWAVE POPCORN ARTICLE AND METHOD OF PREPARATION

FIELD OF THE INVENTION

The present invention relates to food products. More particularly, the present invention relates to microwave popcorn products and to their methods of preparation.

BACKGROUND

Popcorn is a highly popular snack food item. In the past, the at-home preparation of popcorn by the consumer involved adding kernel popcorn plus a cooking oil to a covered pot and heating until the popcorn kernels popped to make popcorn. As used herein, "kernel popcorn" refers to unpopped popcorn. The noun "popcorn" or synonymously "popped popcorn" refers herein to popped kernel popcorn. The adjective "popcorn" can refer to either. Once popped, the popcorn can be flavored such as by the topical addition of melted butter and/or salt.

More recently, microwave popcorn products have become extremely popular. At present, in the U.S., over 70 different brands of microwave popcorn products are available. In general, the more popular microwave popcorn products comprise an expandable paper bag containing a charge of kernel popcorn, fat and salt. The microwave popcorn article is adapted to be heated in a microwave oven for three to five minutes to produce the popped popcorn. More recently, improved microwave popcorn articles have been fabricated employing a metallized susceptor which facilitates the heating of the popcorn-fat charge and which, in turn, leads desirably to increases in popcorn volume and decreases in unpopped kernels. Microwave popcorn articles of this type are described in detail in, for example, U.S. Pat. No. 4,450,180 (issued May 22, 1984 to J. D. Watkins entitled "Package for Increasing the Volumetric Yield of Microwave Cooked Popcorn" and incorporated herein by reference).

While extremely convenient and popular, microwave popcorn articles are not without certain disadvantages. In particular, due to their use as an occasional snack food, microwave popcorn products must be prepared to have an extended shelf life. Since butter and butter containing food products typically require refrigerated distribution and storage, conventional microwave popcorn products are prepared having a shelf stable non dairy fat constituent that is often flavored with an artificial butter flavor.

In the past, microwave popcorn products containing conventional butter have been known under the Act I brand by Golden Valley Microwave Popcorn. However, the butter containing microwave popcorn product required distribution through refrigerated or frozen channels. Due to the inconvenience of required refrigeration distribution, sale and consumer storage, such products never proved to be popular.

It would be desirable to be able to provide a microwave popcorn product containing at least a portion of its fat constituent provided by a real butter ingredient.

It would be further desirable to be able to provide a microwave popcorn product containing a minor but significant portion of its fat constituent provided by a real butter ingredient that did not require refrigeration.

Microwave popcorn articles are also known that contain conventional butter that do not require refrigeration. It is believed that such products can be made due to the extremely low concentration of the real butter. In such products, the butter content is less than 1% and typically about 0.1%.

Given the state of the art as described, there is a continuing need for new and improved microwave popcorn articles containing at least a portion of its fat constituent provided by a real butter ingredient. Accordingly, it is an object of the present invention to provide a new and improved microwave popcorn articles.

It is a further object of the present invention to provide microwave popcorn articles including embodiments having a reduced fat charge, which upon microwave heating can provide popcorn containing at least a portion of its fat constituent provided by a real butter ingredient that nonetheless exhibits extended shelf stability.

It is a further object of the present invention to provide methods by which such microwave popcorn products can be prepared.

It has been surprisingly discovered that the above objectives can be realized and that improved microwave popcorn articles can be provided. The present invention resides in part in the surprising discovery that by incorporation of minor but significant amounts of a high fat butter ingredient, together with a conventional levels of antioxidants in the non dairy fat ingredient, that shelf stable butter ingredient containing microwave popcorn products can be realized. Furthermore, by adding the ingredients in a particular order, embodiments can be prepared that are unexpectedly superior in shelf stability compared to compositionally similar products prepared by alternate methods.

SUMMARY OF THE INVENTION

The present invention relates to improved microwave popcorn articles containing a real butter ingredient and to their methods of preparation. In its article aspect, the present microwave popcorn resides in articles essentially comprising a microwave popcorn bag and a food product charge disposed therein comprising: 1) kernel popcorn, and a fat blend of non-dairy fat and a high fat/low moisture butter ingredient.

The kernel popcorn component essentially comprises about 60% to 98% of the food product charge.

The fat blend component essentially comprises about 2% to 40% of the charge.

The fat blend component essentially comprises about 1% to 20% of the fat blend component of a high fat low moisture butter ingredient. The fat blend component further essentially comprises about 80% to 99% of the fat blend component of a shelf stable non-dairy fat component having 100 to up to about 400 ppm of an antioxidant(s).

The food product charge essentially includes about 1% to 8% of the butter ingredient.

In preferred embodiments, the food product charge can further include about 1% to 6% salt.

In its method aspect, the present invention resides in methods for filling a microwave popcorn bag with a food product charge of popcorn kernels coated with a fat and salt slurry having a butter ingredient. The present methods comprise the steps of:

A. providing a microwave popcorn bag having a sealed bottom end and an open sealable top end defining a seal area in an open configuration; and B. filling the bag with a quantity of a food product charge of kernel popcorn, fat and butter. This step in turn comprises the substeps of:

1. forming a slurry by forming a dispersion of: about 2% to 38% of the food product charge of a melted non-dairy fatty triglyceride and about 0.1% to 6% of the food product charge of salt, said dispersion having a temperature of about 112 to 132° F. (44.4 to 56.6° C.), to form a molten dispersion of the non-dairy fat and salt; wherein the non-dairy fat includes about 100 to 400 ppm of antioxidant.

2. heating about 1% to 8% of the food product charge of a high butterfat butter ingredient to form a liquid butter ingredient having a temperature of about 115 to 140° F. (46 to 60° C.) to form a melted butter ingredient;

3. admixing the molten dispersion of the non-dairy fat and salt with the melted butter ingredient to form a butter ingredient containing fat and salt slurry; wherein the slurry has a temperature of about 112 to 130° F. (44.4 to 54.4° C.);

4. dispensing the kernel popcorn into the bag through the open sealable top;

5. spraying the slurry onto the popcorn.

The method further essentially includes the step of:

C. sealing the open top end of the popcorn bag.

DETAILED DESCRIPTION OF THE INVENTION

Figure 1:
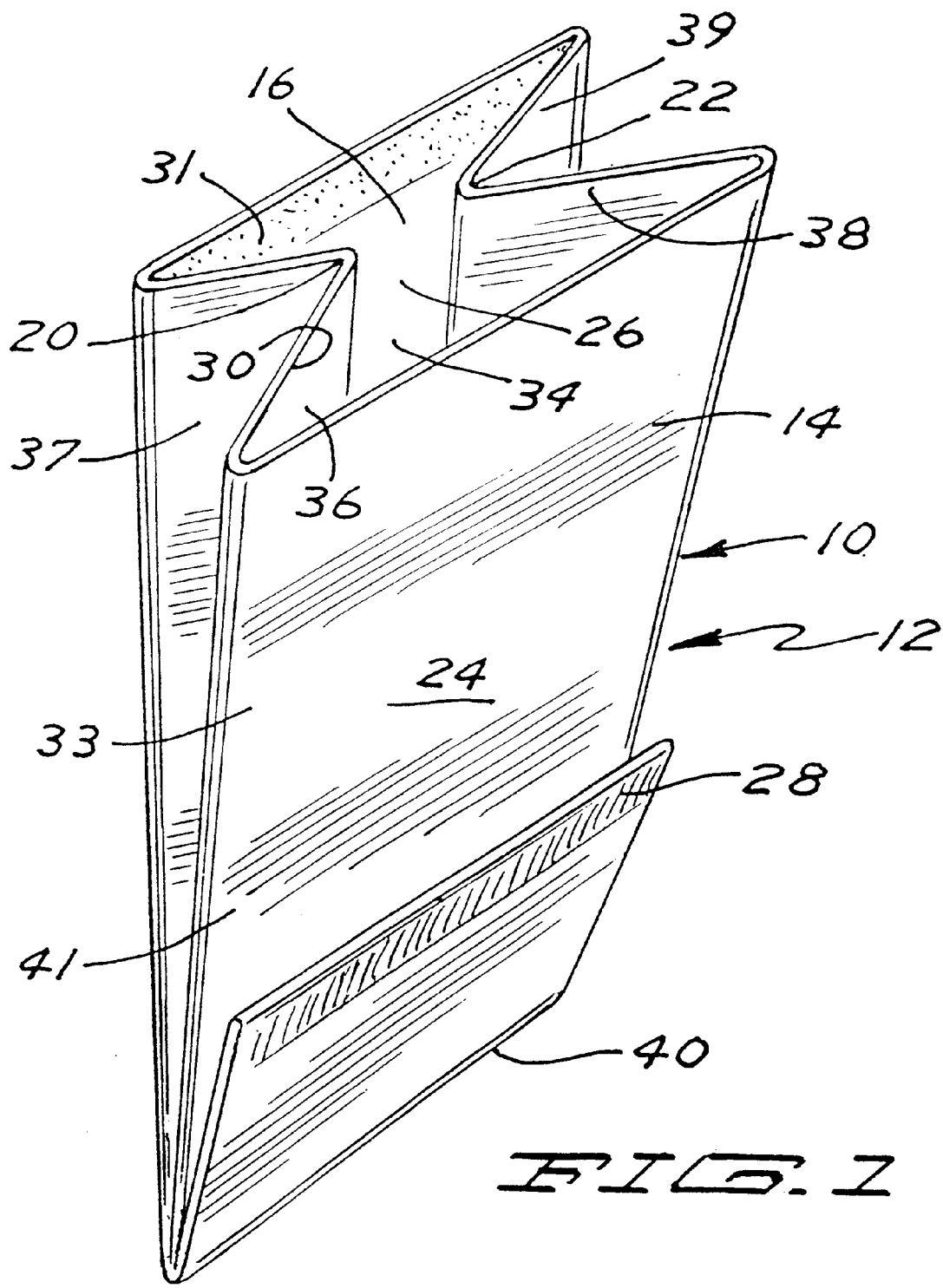
FIG. 1 is a perspective view of a microwave popcorn bag having its upper end unsealed.

The present invention relates to improved microwave popcorn articles containing a minor amount of a low moisture high dairy fat butter ingredient and to their methods of preparation. The present microwave popcorn articles essentially comprise a microwave popcorn bag and a food product charge disposed therein wherein the charge comprises 1) popcorn, and 2) a stabilized fat blend of a non-dairy fat and a defined low moisture high butterfat butter ingredient. Each of these article components as well as produce use and attributes are described in detail below.

Throughout the specification and claims, percentages are by weight and temperatures in degrees Fahrenheit unless otherwise indicated.

Microwave Bag

The present microwave popcorn articles essentially comprise a conventional microwave popcorn popping bag. Useful herein for the microwave popping bag are a wide variety of microwave bags available commercially or known in the art. Useful microwave bags herein can include any conventionally useful bag for microwave popcorn products.

For example, a suitable bag widely used commercially and preferred for use herein is described in the above referenced U.S. Pat. No. 4,450,180. A generally similar bag is described in U.S. Pat. No. 4,548,826 issued Oct. 22, 1985, entitled "Method for Increasing the Volumetric Yield of Microwave Cooked Popcorn" which is incorporated herein by reference. Generally, the bag comprises and is fabricated from a flexible sheet material having two collateral tubular sections. The sections are parallel longitudinally extending that communicate with each other at the center of the package.

Referring now briefly initially to FIG. 1, there is shown an embodiment of a microwave popcorn article 10 composed of a microwave bag 12 formed from flexible sheet material such as paper and being of collateral tubular configuration, that is to say, being composed of a pair of parallel longitudinally extending tubes 14 and 16 which communicate with one another along a central longitudinal opening 18. The two parallel tubes 14 and 16 are separated by longitudinally extending side indentations 20 and 22. When the package comprises a paper bag, the bag can be composed of first and second face panels 24 and 26 respectively and the indentations 20 and 22 comprises gussets. The bag has bottom seal 28 and initially an open top or orifice 30 but a sealable seal area 31. After being filled, the top 30 is also sealed conventionally by means of heat or a suitable adhesive to provide a top seal in the top seal area 31.

The bag material is generally fabricated with multiple plies including an outer ply 33 which is generally paper, a grease-proof or resistant inner ply 34 (preferably grease proof) and microwave susceptor film member or ply (not shown) intermediate these inner and outer paper layers. However, in preferred embodiments the microwave susceptor is present only on one major face panel.

While tubes (or chambers, or channels) 14 and 16 can be of equal size, conventionally the susceptor channel 14 is generally slightly smaller. In such a configuration, the gussets include major left gusset face 36, minor left gusset face 37, major right gusset face 38 and minor right gusset face 39. The bag 12 can be provided with a lower transverse fold 40 to define an intermediate portion or pocket 41.

Although in the present description, a particular description is given to this preferred microwave bag, the present invention is also useful in connection with, for example, flat bottomed bags, bags with or without a bottom fold, with a straight bottom seal or other more complex bottom seal designs. It will also be appreciated that the bag is depicted with its top end open prior to filling and sealing as described herein.

Product Charge

The present article 10 further essentially includes a food product charge comprising a quantity of kernel popcorn disposed within the microwave popcorn bag. Typically, about 60 to 120 g of popcorn is added to the bag, preferably about 65 to 100 g. In general practice, the quantity of popcorn is set and the other ingredients are varied to provide full fat, reduced fat or even low fat, and/or salted or no-salt embodiments. Conventionally, microwave popcorn formulations are now expressed based upon the weight of the entire popcorn and fat charge. This convention is followed in the present description of the invention.

Broadly, the popcorn can range from about 60% to 98% of the food product charge. For full fat products, the popcorn preferably comprises about 60% to 70% of the food product charge.

However, in low fat embodiments hereof, the popcorn constitutes a greater portion of the food product charge. In such low fat embodiments, the present microwave popcorn articles comprise a charge essentially comprising about 90% to 98% kernel popcorn (for non-salt embodiments, 97% for salted products), preferably 91% to 95%, and for best results about 93%.

In reduced fat embodiments, the fat level is at a level between the fat level of full fat and low fat embodiments. In such reduced fat embodiments the popcorn comprises about 80% to 87% of the food product charge.

Conventional kernel popcorn varieties can be used herein. In one variation, highly preferred for use herein relatively larger kernel popcorn varieties can be employed such as those having a kernel count of about 40 to 80 kernels per 10 g, preferably 50 to 65, which are commercially available.

Fat

In the present articles, the food product charge additionally essentially comprises a quantity or charge of a blended fat component.

Generally, the present invention is particularly useful in connection with full fat products but also find usefulness in preparing reduced-fat and with low-fat embodiments. All fat percentages are descriptive of added fat and are not meant to include edible fatty triglyceridic fraction(s) that may be included in the finished product from other ingredients, e.g., the native fat of or from the popcorn.

Thus, broadly, the blended fat component can range from about 2% to about 40% of the food product charge. In the preferred full fat embodiments, the fat component preferably is present at from about 25% to 40% of the food charge. For reduced fat embodiments, the fat comprises about 8% to 15%, (preferably 10% to 14%). In low fat embodiments the charge essentially comprises about 2% to 8% of blended fat component, preferably 3% to 4% fat and for best results about 3.5%.

The blended fat component comprises a greater portion of a conventional, shelf stable non-dairy fat and a lesser portion of a particularly defined high butterfat, low moisture butter ingredient. The present particular butter ingredient is used in a lesser portion of the blended fat primarily due to the relatively high cost of this specialty ingredient.

Non-dairy Fat

The present non-dairy fat constituent can be any conventional shelf stable solid non-dairy fat such as those ingredients currently used in microwave popcorn article.

The non-dairy fat constituent, preferably semi-solid or solid fat, can be from any conventional, shelf stable non-dairy suitable fat(s) or oil(s) or mixtures thereof from vegetable or animal sources including from soybean, cottonseed, safflower, corn, peanut oil(s), canola (rapeseed) and mixtures thereof. The oils can be partially hydrogenated or fully hydrogenated. Preferred for use herein are fats which are partially hydrogenated soybean and/or corn oil. Also useful herein are tropical oils such as coconut oil and palm kernel oil, although present consumer trends disfavor utilization of such oils.

While partially hydrogenating the oil is helpful in providing desired shelf stability, the present shelf stable non-dairy fat(s) essentially additionally include supplemental antioxidants. Useful herein as antioxidants are those conventional materials including tocopherol(s), propyl gallate, butylated hydroxytoluene ("TBHQ"), butylated hydroxyanisole ("TBHA") and mixtures thereof. Desirable antioxidant levels range from about 100 to 400 ppm. Preferably, the antioxidants are used at the maximum use levels permitted by regulation. Preferred for use herein as the antioxidant(s) is a combination of TBHQ at 200 ppm and propyl gallate at 150 ppm.

High Butterfat Low Moisture Butter Ingredient

An essential component of the fat blend constituent is a specially defined high butterfat, low moisture butter ingredient. The present useful butter ingredient importantly is to be distinguished from other dairy materials that are not suitable for use herein such as conventional butter, butter oil or anhydrous butter.

Conventional butter comprises about 80% dairy fat, about 15% to 16% moisture and the balance various non-fat dairy solids. Butter oil consists of the clarified fat portion of milk, cream or butter obtained by the removal of the non-fat constituent. Butter oil contains not less than 99.7% fat, not more than 0.2% moisture and not more than 0.05% milk solids non-fat.

In contrast, useful herein are high butterfat, low moisture butter materials that comprise at least 95% butterfat ("≧95%"), and less than 3% moisture ("3%>"), and the balance dairy solids non-fat. Such materials are prepared by removing the moisture content of conventional butter without destroying the physical structure of the dairy material.

Especially preferred for use herein are ultra high fat butter ingredients. The preferred ultra high fat butterfat can be described as:

| Constituent | Weight % |
| --- | --- |
| Butterfat | >98%, preferably 98.3% to 98.6% |
| Moisture | 1% to 1.5%, preferably 1.1% to 1.3% |
| Milk Solids Non-Fat | Balance, preferably 0.085% to 0.12% |

The ingredient has a yellow to gold butter color. Exemplary solid fat Index ("SFI") profiles are

| Temperature | Percent |
| --- | --- |
| 50° F. (10° C.) | 31 to 36 |
| 70° F. (21° C.) | 11 to 12 |
| 80° F. (26.6° C.) | 8.5 to 10 |
| 90° F. (32° C.) | 2.0 to 2.5 |

Suitable high butterfat low moisture butter and ultra high fat butter are commercially available from Land O' Lakes, Inc.

The non-dairy fat ingredient to butter ingredient weight ratio in the fat blend can range from about 100:1 to 4:1, preferably about 20 to 5:1, and for best results about 9 to 11:1. The food product charge can comprise at least 1% to 8%, preferably about 2% to 4.5% of the low moisture high butterfat ingredient and for best results about 2.5%.

Minor Ingredients

The food product charge can additionally optionally comprise minor amounts of other materials conventionally employed to make the microwave popcorn more aesthetically or nutritionally or organoleptically appealing. Such adjuvant ingredients can include, for example, sugar(s), minerals, vitamins, colorants, preservatives and flavors. If present, each of these constituents can comprise from about 0.01% to about 2% (or more for sugar, cheese solids) by weight of the fat slurry.

Especially desirable for use herein is a supplemental butter flavor. The butter flavors can be either natural, artificial, or a blend and can be in liquid, fat soluble forms and/or in dry powder forms such as a liquid oil absorbed onto a particulate carrier, e.g., gum arabic, starch, silicon dioxide, or dehydrated cheese solids. The added butter flavor is employed to augment the flavor provided by the real butter flavor ingredient.

Chelating agents such as citric acid can be employed to assist in providing extended shelf stability.

Microwave popcorn articles additionally conventionally comprise salt in the food product charge. However, certain line extensions of popular microwave popcorn brands include no-salt or low salt embodiments.

The term slurry is used herein as is common in the microwave popcorn art to refer to any coating applied to the popcorn. The term "slurry" as used generally herein thus includes fat alone; fat and salt; fat, salt, flavors and/or color or sweetener(s); as well as any other variation or combination of ingredients used as an addition to the popcorn herein.

In those salt containing embodiments herein, the charge additionally essentially comprises about 1% to 6% salt, preferably about 2% to 4% and for best results about 2.5%. Of course, both salt free reduced fat and salt free low fat embodiments are contemplated herein as well. If desired, a portion of potassium chloride can be used in full or partial substitution for conventional sodium chloride.

Method of Preparation

Known microwave popcorn article packaging and filling equipment can be used to practice the present methods and to prepare the present improved microwave popcorn articles. A good description of such filling and packaging equipment and methods is given in WO 95/01105 entitled "Reduced Fat Microwave Popcorn and Methods of Preparation" published Jan. 12, 1995 having priority upon commonly assigned U.S. Ser. No. 08/085,607 filed Jun. 9, 1994 (which is incorporated herein by reference).

In the conventional method of filling microwave popcorn bags, a first station would be a popcorn filling station. At this station, the bag is held upright with its top end open or unsealed and with its lower third folded over. A desired quantity of kernel popcorn is then charged, typically by gravity feeding, through the open top into the middle portion of the bag above the fold for the lower third of the bag. The open, folded, partially filled bag is then advanced to the second or next station. The fat and salt addition would be charged to the bag at this second separate station. However, as described in detail in WO 95/01105 preferably in the present method of filling popcorn bags, the popcorn filling and fat addition are performed at the same time and at the same station rather than in sequential separate steps.

A slurry is prepared of the balance of the ingredients. In the novel methods of the present invention, the slurry preparation comprises the substeps of (1) forming a slurry by forming a dispersion of: about 2% to 40% of the food product charge of a melted non-dairy fatty triglyceride and about 0.1% to 6% of the food product charge of salt, said dispersion having a temperature of about 112 to 132° F. (44.4 to 55.5° C.) to form a molten dispersion of the non-dairy fat and salt.

Next, the slurry preparation comprises the second substep of (2) heating about 1% to 8% of the food product charge of a high butterfat butter ingredient to form a liquid butter ingredient. Good results are obtained when the butter is heated to a temperature of about 115 to 140° F. (46 to 60° C.) to form a melted butter ingredient.

Thereafter, the present process comprises the third substep of (3) admixing the molten dispersion of the non-dairy fat and salt with the melted butter ingredient to form a butter ingredient containing homogeneous fat and salt slurry.

The addition of any minor ingredients can be made to the slurry so prepared.

It is important to thoroughly admix the slurry to obtain an homogeneous mixture. Thorough admixing helps to insure that the finished article desirably exhibits maximum shelf stability.

The slurry, while still warm, 112° to 130° F. (44.4° to 54.4° C.), is then sprayed onto the popcorn. In one variation, the popcorn is charged to the bag and, thereafter, the slurry is added to the bag. Either a pencil jet stream of the slurry, or preferably, a fan spray of the slurry is employed. A fan spray is preferred due to the increase in the surface area coverage of the fat onto the popcorn. Such an increase in the dispersion in turn results in a finished popcorn wherein the fat and salt are more evenly distributed while filling the bag. As noted above, preferably the slurry is fan sprayed onto the popcorn as the popcorn falls into the bag. Such co-filling is especially useful in low fat or reduced fat embodiments.

Once filled, the bags are then advanced to a sealing station wherein the top orifice 30 is sealed such as by retractable heat sealing jaws which impart a seal in the heat seal area. The filled and sealed microwave popcorn bags are then advanced to subsequent downstream packaging operations. Such subsequent downstream packaging operations include folding the bags again to provide a three-folded bag, i.e., to provide a second upper transverse fold, overwrapping the folded bags with an overwrap or moisture barrier layer, and inserting desired numbers of the packaged article into cartons.

While not wishing to be bound by the proposed theory, it is speculated herein that in conventional microwave popcorn articles, upon initial manufacture, the microwave popcorn articles employ kernel popcorn having a native or adjusted moisture content optimized for popcorn volume. Kernel popcorn have moisture contents typically around 12% to 14% and have water activities of about 0.65. However, upon extended storage, typical of conventional distribution, the kernel popcorn being relatively more moist (i.e., having a higher water activity) tend over time to lose moisture throughout the popcorn pericarp to the fat with the solid salt crystals dispersed therein. This moisture migration is due to the fat/crystalline salt matrix having an initial very low water activity of about 0.1 which, relatively is extremely dry. As moisture is lost from the kernel popcorn, the kernel popcorn experience a moisture reduction to a suboptimum moisture concentration. Eventually, the popcorn/fat charge reaches equilibrium water activity of very approximately about 0.5. Thus, while the kernel popcorn may pop, the popcorn volume obtained is suboptimal. Also, the number of unpopped kernels tend to increase.

Accordingly, it is an unexpected advantage of the present invention that by obtaining a very small quantity of moisture provided by the butter ingredient herein that not only the advantages of a desirable butter flavor are obtained but simultaneously unexpectedly greater popcorn volumes are obtained as well as some improvement in the number of unpopped kernels. Thus, the slurry or fat blend herein is importantly characterized by the presence of essential but low moisture levels. The fat blend or slurry's moisture content essentially ranges from about 0.01% to 0.3%. Excessive moisture is to be avoided in order to minimize the possibility of promoting undesirable mold growth during extended storage.

The microwave popcorn products prepared as described can be used in a conventional manner for the at-home preparation of popcorn by microwave heating. Upon microwave heating, the popcorn exhibits an improved flavor by virtue of the inclusion of the butter ingredient.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the microwave popcorn art, can be undertaken without departing from the spirit and scope of the invention.

Industrial Activity

The present invention finds suitability for use in the provision of a mass market, shelf stable consumer food item adapted to prepare oiled, flavored popcorn upon microwave heating.

EXAMPLE 1

An improved microwave popcorn article of the present invention comprising a microwave popcorn bag was prepared having the popcorn/fat charge of the composition indicated below. The microwave popcorn bag is fabricated substantially in accordance with the teachings of U.S. Pat.

No. 4,450,180. Microwave popcorn articles comprising microwave popcorn bags of this type are available under the brand name Betty Crocker™ Pop Secret™. The popcorn fat charge had the following composition:

| Ingredients | Weight % |
| --- | --- |
| Popcorn | 63.7 |
| Fat[1] | 31.0 |
| High fat butter[2] | 2.5 |
| Salt | 2.5 |
| Artificial butter flavor | 0.3 |
| Yellow color | Trace |
| | 100.0% |

[1] An hydrogenated soybean oil available from Cargill.
[2] Available from Land O' Lakes.

A fat slurry is prepared by heating the non-dairy fat to about 122° F. (50° C.) and admixing the salt therein to form a dispersion. The butter is melted by heating to 122° F. (50° C.) and mixed with the fat/salt dispersion to form the slurry. The artificial butter flavor is also added to the slurry.

About 100 g of popcorn is dropped from a hopper into the open end of a microwave popcorn bag. While falling, the slurry (122° F., 50° C.) is sprayed onto the falling stream of popcorn.

The finished article contains 159 g of the food product charge.

The microwave popcorn bag filled with popcorn and slurry is next heat sealed to close its open top to form the present improved microwave popcorn article.

What is claimed is:

1. An improved microwave popcorn article useful in the microwave heating of popcorn characterized by containing a real butter ingredient but not requiring refrigeration, comprising:
   a. a microwave popcorn bag,
   b. a food product charge disposed within the bag, comprising
      1. about 60 to 98% by weight of the charge of kernel popcorn, and
      2. about 2 to 40% by weight of the charge of a fat blend comprising
         a) a non-dairy fat having about 100 to 400 ppm of at least one antioxidant, and
         b) a high butterfat low moisture butter ingredient having a butterfat content of at least 95%, a moisture content of 1% to about 3%, and the balance milk solid non-fat,
            wherein the butter content ranges from at least 1% to about 8% of the food product charge, and
            wherein the fat blend has a moisture content of about 0.01% to 0.3% and
            wherein the food product charge is shelf stable without refrigeration.

2. The article of claim 1
   wherein the edible fat is a material selected from the group consisting of low melting point fats, partially hydrogenated oils, fluid fats, and
   wherein the kernel popcorn is essentially free of any film forming coating.

3. The article of claim 2
   wherein the popcorn has a kernel count of about 40 to 80 per 10 g, and
   wherein the food product charge includes about 60 to 120 g popcorn.

4. The article of claim 3
   wherein the food product charge additionally comprising about 1% to 6% salt homogeneously mixed with the fat blend.

5. The article of claim 4
   wherein the weight ratio of non-dairy fat to high butterfat low moisture butter ranges from about 100 to 4:1.

6. The article of claim 5
   wherein the antioxidants are selected from the group consisting of tocopherol(s), propyl gallate, butylated hydroxytoluene ("TBHQ"), butylated hydroxyanisole ("TBHA") and mixtures thereof.

7. The article of claim 6 wherein the weight ratio of non-dairy fat to high without low moisture butter ranges from about 20 to 5:1.

8. The article of claim 7 wherein the weight ratio of non dairy fat to high butterfat low moisture butter ranges from about 9 to 11:1.

9. The article of claim 5
   wherein the food product charge has a reduced fat content, and
   wherein the food product charge comprises 80% to 87% by weight of the food product charge of kernel popcorn and about 8% to 15% by weight of the fat blend.

10. The article of claim 5 comprising:
    about 60% to 70% by weight of the food product charge of kernel popcorn, about 25% to 40% of the fat blend, and
    wherein the butter ingredient comprises an ultra high butterfat butter ingredient.

11. The low fat article of claim 5 comprising:
    about 90% to 98% by weight of the food product charge of kernel popcorn, and
    about 2% to 8% fat blend.

12. A method for filling and sealing a microwave popcorn bag with popcorn kernels coated with a fat blend containing real butter, comprising the steps of:
    A. providing a microwave popcorn bag having a sealed bottom end and an open sealable top end defining a seal area in an open configuration;
    B. filling the bag with a quantity of a food product charge of kernel popcorn, fat and butter, comprising the substeps of:
       1. forming a dispersion of about 2% to 38% of a melted non-dairy fatty triglyceride containing about 100 to 400 ppm of at least one antioxidant to form a molten dispersion of the non-dairy fat;
       2. heating about 1% to 8% of a high butterfat butter to form a melted butter ingredient, said ingredient having a butterfat content of at least 95%, a moisture content of 1% to about 3% and a balance of milk solids non-fat to form a melted butter ingredient;
       3. admixing the molten dispersion of the non-dairy fat and salt with the melted butter ingredient to form a butter ingredient containing fat slurry;
       4. dispensing the kernel popcorn into the bag through the open sealable top;
       5. spraying said slurry onto the popcorn;
    C. sealing the open top end of the popcorn bag to form a shelf stable article not requiring refrigeration.

13. The method of claim 12 wherein in Step B(2) the melted butter ingredient has a temperature of about 115 to 140° F. (46 to 60° C.), wherein in Step B(3) the slurry has a temperature of about 112 to 132° F. (44.4 to 56.6° C.).

14. The method of claim 13 wherein the slurry additionally comprises about 1% to 6% by weight of the food product charge of salt.

15. The method of claim 14 wherein the weight ratio of non-dairy fat to butter ingredient ranges from about 100 to 4:1.

16. The method of claim 15 wherein the kernel popcorn quantity ranges from about 80% to 87% by weight of the food product charge, and wherein the slurry ranges from about 8% to 15% by weight.

17. The method of claim 15 wherein the kernel popcorn quantity ranges from about 60% to 70% by weight of the food product charge, and wherein the fat slurry ranges from about 25% to 40%, and about 1% to 4% of salt.

18. The microwave popcorn kernel article prepared by the method of claim 17.

19. The method of claim 15 wherein the popcorn quantity ranges from about 90% to 97%, wherein the fat quantity ranges from about 2% to 5%, and wherein the salt quantity ranges from about 1% to 4%.

20. The method of claim 14 wherein the substeps of 4) dispensing the kernel popcorn into the bag and 5) spraying the slurry onto the popcorn is performed simultaneously.

21. The method of claim 20 wherein the popcorn is dispensed in the form of a cylindrical cascade defining a stream diameter, and wherein said spraying is oriented to spray the slurry in the direction of and into the airborne popcorn stream and at an angle of about 0° to 90° relative to the popcorn stream to form an intersection between the spray and the popcorn stream.

22. The method of claim 13 wherein the weight ratio of non-dairy fat to high without low moisture butter ranges from about 20 to 5:1.

23. The method of claim 22 wherein the weight ratio of non dairy fat to high butterfat low moisture butter ranges from about 9 to 11:1.

24. The microwave popcorn kernel article prepared by the method of claim 12.

* * * * *